(12) United States Patent
Muto et al.

(10) Patent No.: US 7,201,143 B2
(45) Date of Patent: Apr. 10, 2007

(54) INTAKE AMOUNT CONTROL APPARATUS OF INTERNAL COMBUSTION ENGINE

(75) Inventors: Harufumi Muto, Ann Arbor, MI (US); Kakuji Kagoshima, Toyota (JP); Yuichiro Ido, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/247,145

(22) Filed: Oct. 12, 2005

(65) Prior Publication Data

US 2006/0075990 A1  Apr. 13, 2006

(30) Foreign Application Priority Data

Oct. 13, 2004 (JP) .............................. 2004-299014

(51) Int. Cl.
*F02D 11/10* (2006.01)
*F02L 1/34* (2006.01)

(52) U.S. Cl. ................. 123/399; 123/324; 123/348

(58) Field of Classification Search ............. 123/325, 123/326, 328, 321, 361, 403, 404, 405, 376, 123/179.4, 198 DB, 339.23, 399, 348, 90.16; 701/104, 112

See application file for complete search history.

(56) References Cited

U.S. PATENT DOCUMENTS 7,051,704 B2 * 5/2006 Kawamura .................. 123/322

FOREIGN PATENT DOCUMENTS

| JP | A-08-074639 | 3/1996 |
| JP | A-10-089095 | 4/1998 |

* cited by examiner

*Primary Examiner*—Johnny H. Hoang
(74) *Attorney, Agent, or Firm*—Kenyon & Kenyon LLP

(57) ABSTRACT

An intake amount control apparatus of an internal combustion engine in accordance with the invention includes a control portion that controls an opening amount of a throttle valve provided in an intake passageway of the internal combustion engine and operation of a lift amount changing mechanism capable of changing a lift amount of an intake valve. The control portion controls the operation of the lift amount changing mechanism so that, prior to execution of a fuel cut control at the time of an engine deceleration, the lift amount of in intake valve becomes smaller than at the time of a normal engine idle operation where the fuel cut control is not executed.

11 Claims, 6 Drawing Sheets

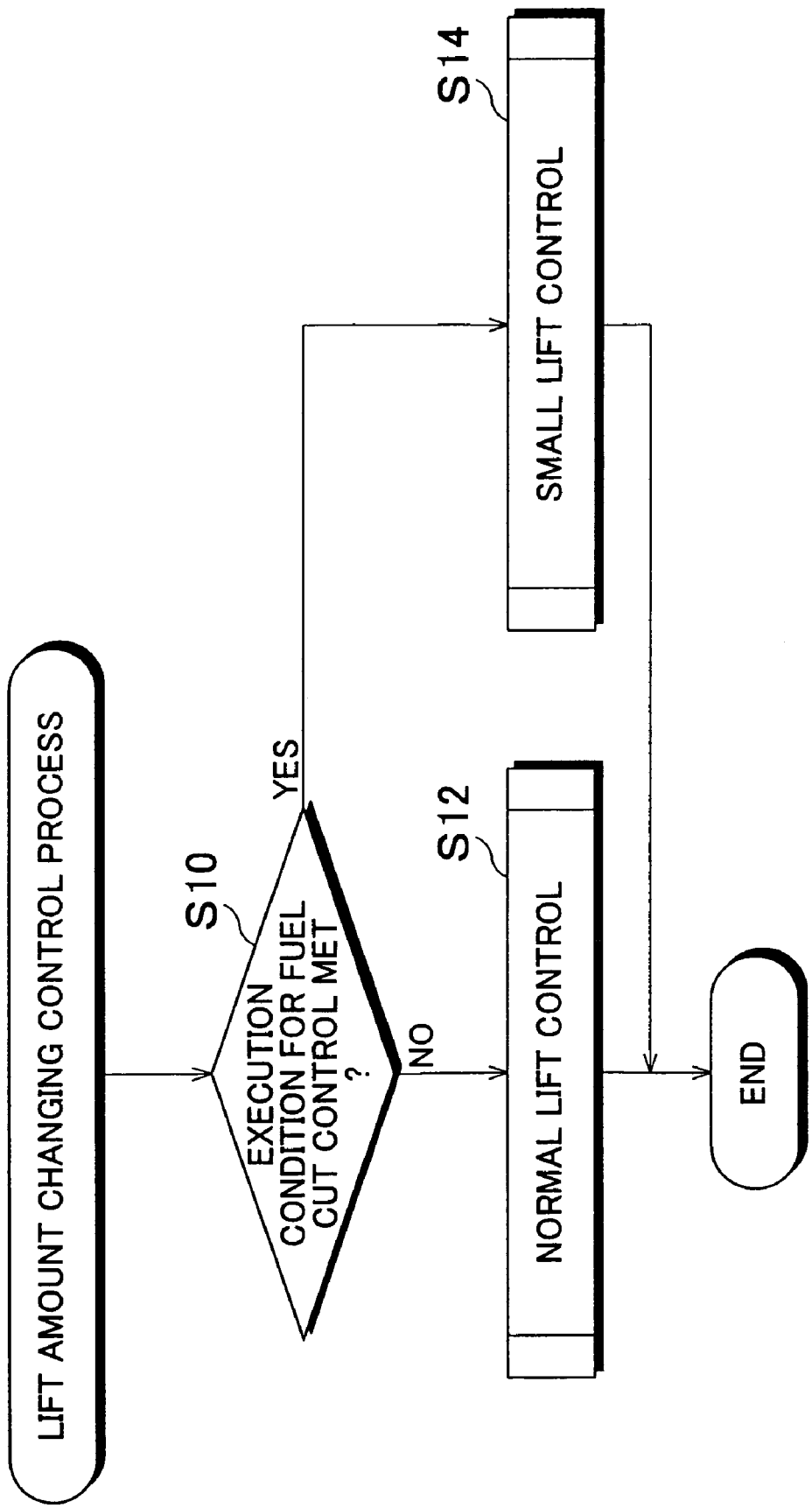

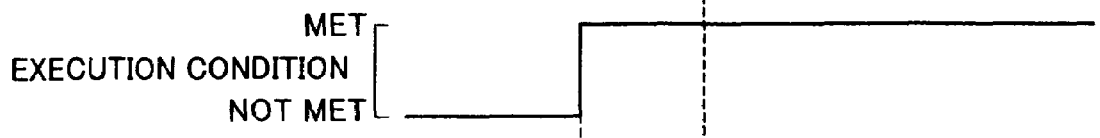
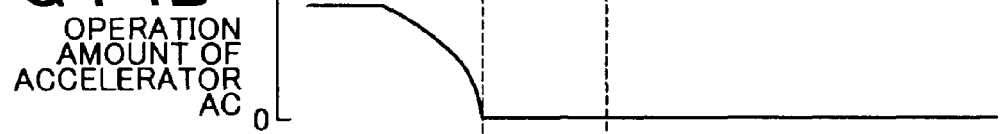
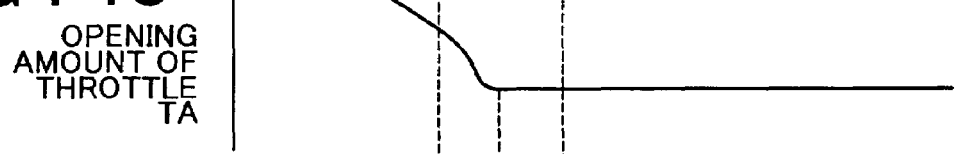

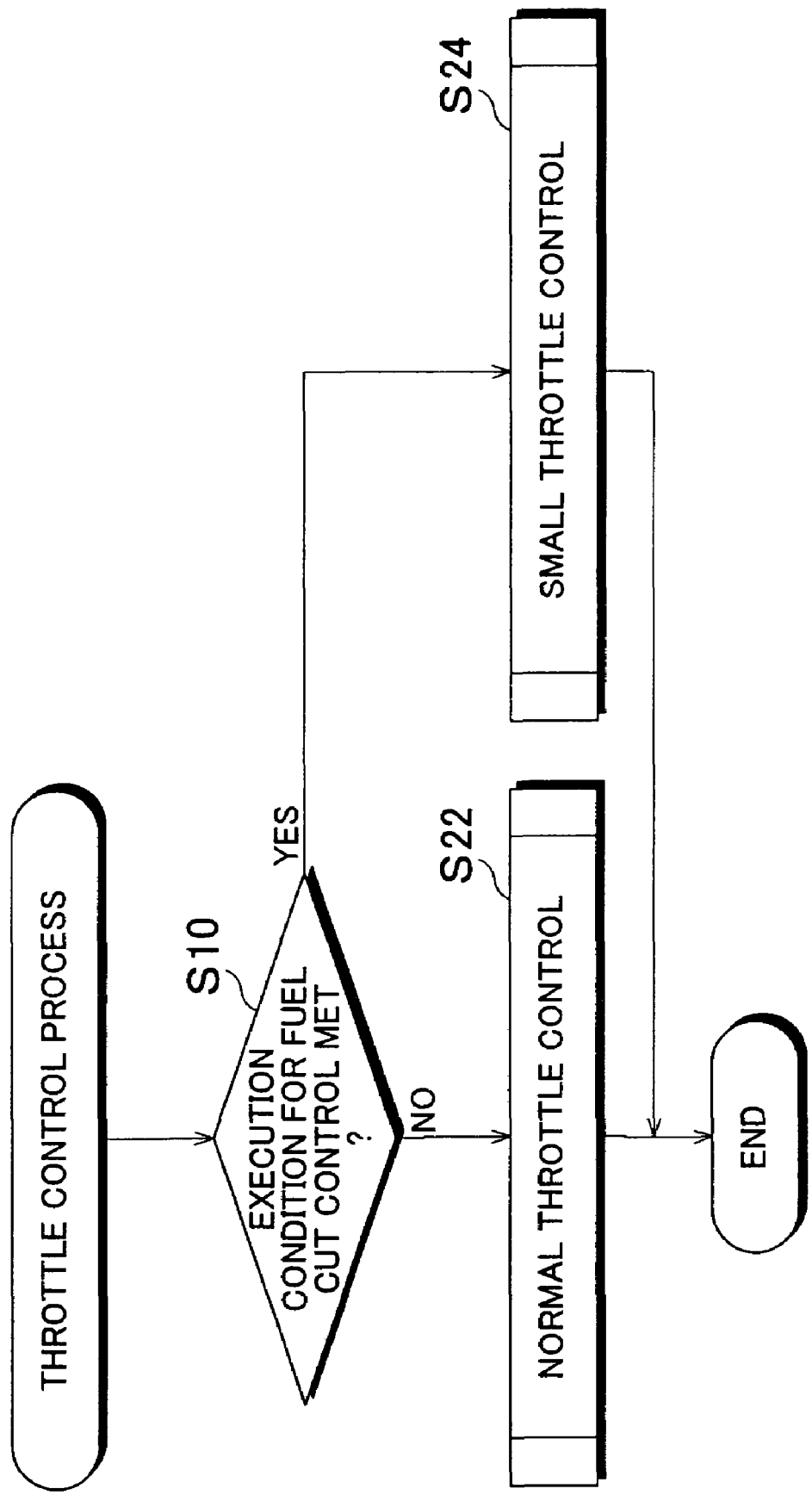

INTAKE AMOUNT CONTROL APPARATUS OF INTERNAL COMBUSTION ENGINE

INCORPORATION BY REFERENCE

The disclosure of Japanese Patent Application No. 2004-299014 filed on Oct. 13, 2004, including the specification, drawings and abstract, is incorporated herein by reference in its entirety.

BACKGROUND OF THE INVENTION

1. Field of the Invention

The invention relates to an intake amount control apparatus of an internal combustion engine in which a fuel cut control is executed at the time of engine deceleration.

2. Description of the Related Art

In internal combustion engines, the amount of intake is adjusted through the adjustment of the opening amount of a throttle valve provided in an intake passageway, and the amount of fuel corresponding to the amount of intake is injected into an engine combustion chamber. This technology is disclosed in, for example, Japanese Patent Application Laid-Open Publication No. JP-A-08-074639. Furthermore, at the time of engine deceleration, a so-called termed fuel cut control that temporarily stops the injecting supply of fuel, provided that a predetermined condition is met, for example, the engine rotation speed is a predetermined rotation speed or higher, or the like, is performed so as to improve the fuel economy.

It is to be noted herein that although the fuel economy can be improved by executing the fuel cut control, the execution of this control causes no more combustion of fuel and naturally results in reduction in engine torque. Therefore, if the engine torque prior to the execution of the fuel cut control is large, the fuel cut control results in occurrence of a so-called torque shock. Hence, it can be said to be desirable to eliminate or reduce as much as possible the sudden change in engine torque associated with execution of the fuel cut control by reducing the engine torque as much as possible prior to the execution of the control.

An intake passageway downstream of the throttle valve, that is, an intake passageway extending from the throttle valve to the engine combustion chamber, is provided with members that have large capacities, for example, a surge tank, and the like. Therefore, even though the opening amount of the throttle valve is changed to a state near a completely closed state, that is, to an opening amount that allows maintenance of an idle operation, in accordance with deceleration of the internal combustion engine, the intake air remaining downstream of the throttle valve continues to be introduced into the engine combustion chamber after the changing. In particular, this tendency becomes very remarkable in an internal combustion engine equipped with a changing mechanism that changes the lift amount of the intake valves, since in this type of engine the lift amount is set at a reduced amount at the time of engine deceleration. Therefore, the engine torque can be reduced in expectation of execution of the fuel cut control, but only in a limited fashion. Furthermore, if the fuel cut control is executed after the engine torque has sufficiently reduced, the sharp change in engine torque can be eliminated or reduced, but the start of the fuel cut control is delayed, so that deteriorated fuel economy is inevitable.

SUMMARY OF THE INVENTION

An intake amount control apparatus of an internal combustion engine in accordance with the invention includes a control portion that controls an opening amount of a throttle valve provided in an intake passageway of the internal combustion engine and operation of a lift amount changing mechanism capable of changing a lift amount of an intake valve. The control portion controls the operation of the lift amount changing mechanism so that, prior to execution of a fuel cut control at the time of an engine deceleration, the lift amount of the intake valve becomes smaller than at the time of a normal engine idle operation where the fuel cut control is not executed.

According to the foregoing constitution, the lift amount of the intake valve is set small. Therefore, even if the intake passageway extending from the throttle valve to the combustion chamber has a large capacity, the influence thereof is substantially eliminated or reduced, and the amount of intake introduced into the combustion chamber can be promptly reduced. Thus, prior to execution of the fuel cut control, the amount of intake air introduced into the combustion chamber is reduced and, on the other hand, the pumping loss is increased, so that the engine torque is reduced to allow prompt transition to the fuel cut control. Hence, it becomes possible to achieve prompt transition to execution of the fuel cut control and eliminate or reduce as much as possible a sudden change in engine torque associated with the execution thereof.

BRIEF DESCRIPTION OF THE DRAWINGS

The above mentioned embodiment and other embodiments, objects, features, advantages, technical and industrial significance of this invention will be better understood by reading the following detailed description of the exemplary embodiments of the invention, when considered in connection with the accompanying drawings, in which:

FIG. 3 is a flowchart illustrating a concrete processing procedure of a lift amount changing control process in accordance with the first embodiment;

FIGS. 4A to 4E are timing charts illustrating an example of the processing manner of the lift amount changing control process;

FIG. 5 is a flowchart illustrating a concrete processing procedure of a throttle control process in accordance with a second embodiment of the invention.

DETAILED DESCRIPTION OF THE PREFERRED EMBODIMENTS

In the following description, the invention will be described in more detail in terms of exemplary embodiments.

A first embodiment in which the intake amount control apparatus of an internal combustion engine of the invention is embodied will be hereinafter described.

Figure 1:
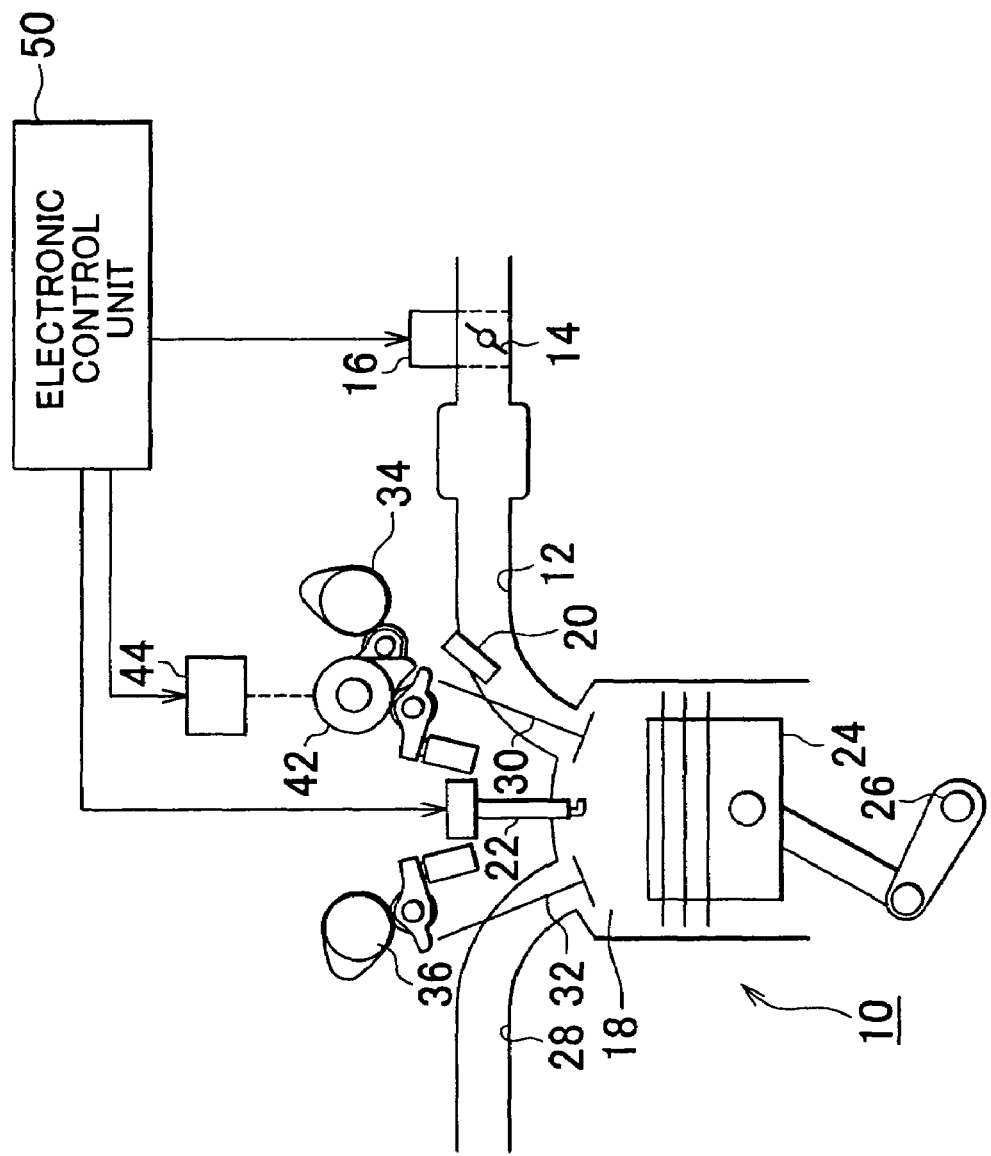
FIG. 1 is a schematic diagram illustrating constitutions of an internal combustion engine and its peripheral appliances to which a first embodiment of the invention is applied.

FIG. 1 shows an overall constitution of an intake amount control apparatus in accordance with this embodiment. As shown in FIG. 1, an intake passageway 12 of an internal combustion engine 10 is provided with a throttle valve 14. A throttle motor 16 is connected to the throttle valve 14. Through the drive control of the throttle motor 16, the opening amount of the throttle valve 14 (throttle opening amount TA) is adjusted, so that the amount of air taken into a combustion chamber 18 through the intake passageway 12 is adjusted. Furthermore, the intake passageway 12 is provided with a fuel injection valve 20. This fuel injection valve 20 injects fuel into the intake passageway 12, as exhaust gas.

In the combustion chamber 18 of the internal combustion engine 10, a mixture formed by intake air and injected fuel is ignited by an ignition plug 22. Due to this igniting operation, the mixture burns, so that a piston 24 reciprocates and therefore a crankshaft 26 rotates. Then, the mixture after combustion is sent out of the combustion chamber 18 into an exhaust passageway 28.

In the internal combustion engine 10, the intake passageway 12 and the combustion chamber 18 are connected to/disconnected from each other by the opening and closing actions of an intake valve 30, and the combustion chamber 18 and the exhaust passageway 28 are connected to/disconnected from each other by the opening and closing actions of an exhaust valve 32. The intake valve 30 is opened and closed due to rotation of an intake camshaft 34 to which rotation is transferred from a crankshaft 26. Likewise, the exhaust valve 32 is opened and closed due to rotation of an exhaust camshaft 36 to which rotation is transferred from the crankshaft 26.

Figure 2:
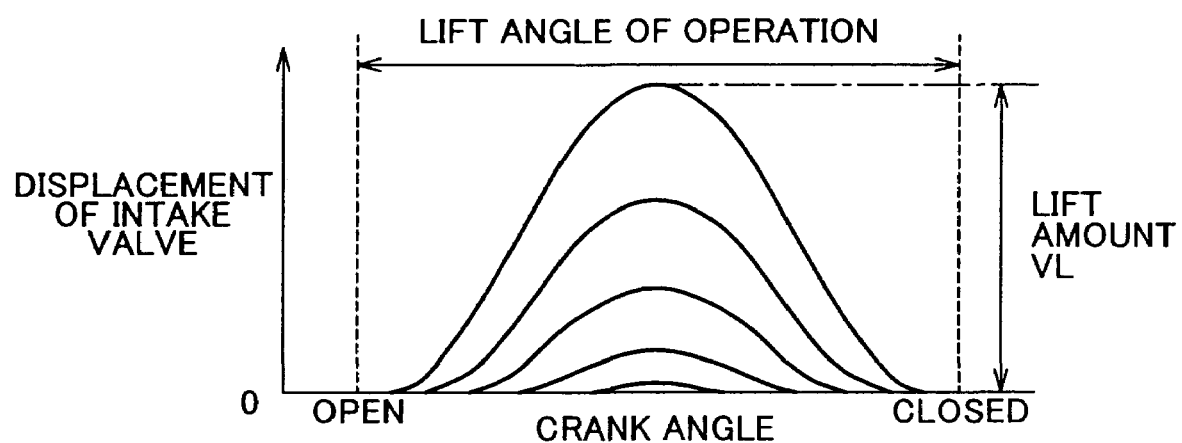
FIG. 2 is a graph indicating manners of changes of the lift amount of an intake valve based on the operation of a lift amount changing mechanism.

A lift amount changing mechanism 42 is provided between the intake camshaft 34 and the intake valve 30. This lift amount changing mechanism 42 variably sets the lift amount VL of the intake valve 30 in accordance with the engine operation condition, and is operated through the drive control of an actuator 44 such as an electric motor or the like. As indicated in FIG. 2, due to the operation of the lift amount changing mechanism 42, the lift amount VL of the intake valve 30 changes synchronously with the open valve duration (lift angle of operation); for example, the lift amount VL decreases as the lift angle of operation decreases.

In this embodiment, the amount of intake is adjusted through a cooperation control of the control of the opening amount of the throttle valve 14 (FIG. 1) (throttle control) and the control of the operation of the lift amount changing mechanism 42 (lift amount changing control). The amount of intake increases with increases in the throttle opening amount TA and with increases in the lift amount VL of the intake valve 30. Therefore, in the foregoing cooperation control, if the amount of intake suitable for the state of operation of the internal combustion engine 10 is larger, the lift amount VL of the intake valve 30 and the throttle opening amount TA are set progressively larger so that the amount of intake is adjusted to a desired amount.

Furthermore, in this embodiment, the amount of fuel injection is adjusted in a manner corresponding to the amount of intake adjusted through the foregoing cooperation control. Concretely, the amount of air that is actually taken into the combustion chamber 18 is determined through the use of an intake amount sensor or an intake pressure sensor provided in the intake passageway 12, or the like, and the amount of fuel corresponding to the thus-determined amount of intake is injected from a fuel injection valve 20.

The internal combustion engine 10 is provided with various sensors for detecting states of operation of the engine 10. Examples of the various sensors provided for the engine 10 include a crank sensor for detecting the rotation speed of the crankshaft 26 (engine rotation speed NE), and an accelerator sensor for detecting an operation amount of an accelerator pedal (not shown) AC. Furthermore, a throttle sensor for detecting the throttle opening amount TA, a lift amount sensor for detecting the lift amount VL of the intake valve 30 (more precisely, the amount of operation of the lift amount changing mechanism 42), etc. are provided.

The internal combustion engine 10 is provided with an electronic control unit 50 that has, for example, a microcomputer. This electronic control unit 50 takes up detection signals from various sensors, and carries out various computations, and executes engine controls, such as a throttle control, a lift amount changing control, a fuel injection control, etc., on the basis of results of the various computations.

Incidentally, in the fuel injection control, the fuel cut control is executed provided that a predetermined execution condition is met at the time of deceleration of the internal combustion engine 10. In this fuel cut control, concretely, the engine torque is reduced, and then the fuel injection from the fuel injection valve 20 is stopped.

In this embodiment, the control manner of the lift amount changing control is switched between the case where the fuel cut control is executed and the case where it is not executed. Concretely, in the case where fuel cut control is executed, the operation of the lift amount changing mechanism 42 is controlled so that, prior to the execution of the fuel cut control, the lift amount VL of the intake valve 30 becomes smaller than at the time of a normal operation where the fuel cut control is not executed.

A concrete processing procedure of a process involved in the lift amount changing control will be described with reference to a flowchart shown in FIG. 3. Incidentally, a series of processes shown in this flowchart are to show a concrete processing procedure of the lift amount changing control process.

As shown in FIG. 3, this process begins with determination as to whether a execution condition for the fuel cut control is met (step S10). It is herein determined that the execution condition is met if, for example, the following conditions are all met. (i) The accelerator pedal is not depressed. Concretely, the operation amount of the accelerator AC is "0". (ii) The engine rotation speed NE is greater than or equal to a predetermined speed.

If the execution condition is not met (NO at step S10), the lift amount changing control in a normal control manner (normal lift control) is executed (step S12). Concretely, a control target value regarding the lift amount of the intake valve 30 (target lift amount Tv1) is set on the basis of the operation amount of the accelerator AC, and/or engine operation states, such as the engine rotation speed NE or the like, and the lift amount changing mechanism 42 is operated and controlled so that the target lift amount Tv1 and the actual lift amount VL become equal to each other.

Conversely, if the execution condition is met (YES at step S10), a control of making the lift amount VL of the intake valve 30 smaller than the lift amount achieved during the normal lift control (small lift control) is executed (step S14). Concretely, a lift amount that is smaller than the target lift amount Tv1 set in the normal lift control is set as a target lift amount Tv1. Incidentally, examples of conceivable techniques for setting the target lift amount Tv1 as described above include a technique in which in an apparatus that performs a map computation of the target lift amount Tv1 the map used for the computation is switched between the time of execution of the normal lift control and the time of execution of the small lift control, a technique in which the target lift amount Tv1 set at the time of the normal lift control is reduced for correction, etc.

Next, a concretely processing manner of the lift amount changing control process will be described with reference to FIGS. 4A to 4E. FIGS. 4A to 4E are timing charts illustrating an example of the processing manner of the lift amount changing control process in the case where the execution condition for the fuel cut control is met.

If, at a time t11, the accelerator pedal is released from depression so that the operation amount of the accelerator AC (FIG. 4B) becomes "0", both the throttle opening amount TA (FIG. 4C) and the lift amount VL (FIG. 4D) correspondingly reduce to magnitudes that are suitable for the idle operation of the internal combustion engine 10.

At this moment, the execution condition (FIG. 4A) regarding the fuel cut control is met in this embodiment. Therefore, at a time t12, the lift amount VL of the intake valve 30 is controlled so as to become smaller than the lift amount set in the normal lift control (the lift amount indicated by a one-dot chain line in FIG. 4D).

Therefore, in the internal combustion engine 10 in which the intake passageway 12 extending from the throttle valve 14 to the combustion chamber 18 has a large capacity, the influence of the large capacity is reduced, so that the amount of intake introduced into the combustion chamber 18 (FIG. 4E) is more promptly reduced than the amount of intake in the case where the lift amount VL of the intake valve 30 is not made small (indicated by a one-dot chain line in FIG. 4E). Thus, prior to execution of the fuel cut control (time t13), the amount of intake air introduced into the combustion chamber 18 is reduced and, on the other hand, the pumping loss is increased, so that the engine torque is reduced to allow prompt transition to the fuel cut control.

Furthermore, after the execution of the fuel cut control begins (time t14 to t15), the lift amount VL of the intake valve 30 is increased until it becomes equal to the lift amount that is achieved at the time of the normal lift control. Therefore, in comparison with the case where the lift amount VL is not increased in the foregoing fashion, the internal combustion engine 10 is operated in a state of reduced pumping loss, so that the sharp increase in engine torque upon the start of fuel supply resulting from an interruption of the fuel cut control can be eliminated or reduced.

When the lift amount VL of the intake valve 30 is increased as described above, the lift amount VL is gradually increased. Therefore, while the lift amount VL of the intake valve 30 is increased to reduce the pumping loss, a sharp reduction thereof is eliminated or reduced.

As can be understood from the above description, this embodiment achieves the following advantages:

(1) Prior to execution of the fuel cut control, the lift amount changing control is executed so that the lift amount VL of the intake valve 30 becomes smaller than at the time of the normal idle operation where the fuel cut control is not executed. Therefore, the amount of intake air introduced into the combustion chamber 18 is reduced and, on the other hand, the pumping loss is increased prior to execution of the fuel cut control, so that the engine torque is reduced to allow prompt transition to the fuel cut control. Hence, it becomes possible to achieve prompt transition to execution of the fuel cut control and eliminate or reduce as much as possible a sudden change in engine torque associated with the execution thereof.

(2) The lift amount VL of the intake valve 30 is increased during execution of the fuel cut control. Therefore, in comparison with the case where the lift amount VL is not increased, the internal combustion engine 10 is operated in a state of reduced pumping loss, so that the sharp increase in engine torque upon the start of fuel supply resulting from the interruption of the fuel cut control can be eliminated or reduced.

(3) Furthermore, when the lift amount VL of the intake valve 30 is increased, the lift amount VL is gradually increased. Therefore, the sharp reduction in pumping loss associated with the increase in the lift amount VL can be eliminated or reduced, and the shock feel associated with such a sharp reduction in pumping loss can be mitigated.

A second embodiment in which the intake amount control apparatus of an internal combustion engine of the invention is embodied will be described below.

This embodiment and the first embodiment differ from each other in the following respects. The intake amount control apparatus in accordance with the first embodiment executes the lift amount changing control so that, prior to execution of the fuel cut control, the lift amount VL of the intake valve 30 becomes smaller than at the time of the normal idle operation where the fuel cut control is not executed. On the other hand, the intake amount control apparatus of the second embodiment executes a throttle control along with execution of the lift amount changing control so that the throttle opening amount TA becomes smaller than at the time of the normal idle operation where the fuel cut control is not executed.

The overall constitutions of the internal combustion engine and its peripheral appliances to which the intake amount control apparatus of this embodiment is applied are substantially the same as the overall constitutions of the internal combustion engine 10 and its peripheral appliances shown in FIG. 1, and detailed description thereof will be omitted below. Furthermore, as for the engine controls in this embodiment, the lift amount changing control and the fuel injection control are also executed. The control manners of those controls are assumed to be substantially the same as the control manners in the first embodiment, and detailed description thereof will be omitted below.

The throttle control in accordance with the second embodiment is executed as described below. FIG. 5 illustrates a concrete processing procedure of the process of the throttle control. As show in FIG. 5, firstly in this process, it is determined whether the aforementioned execution condition is met (step S10). If the execution condition is not met (NO at step S10), the throttle control in a normal control manner (normal throttle control) is executed (step S22). Concretely, on the basis of the operation amount of the accelerator AC and/or engine operation states, such as the engine rotation speed NE and the like, a control target value regarding the throttle opening amount TA (target throttle opening amount Tta) is set, and the throttle motor 16 is driven and controlled so that the actual throttle opening amount TA and the target throttle opening amount Tta become equal.

Conversely, if the execution condition is met (YES at step S10), a control that makes the throttle opening amount TA smaller than the throttle opening amount TA that is achieved in the normal control manner (small throttle control) is executed (step S24). Concretely, the present target throttle opening amount Tta is set at a throttle opening amount TA that is smaller than the target throttle opening amount Tta that is set in the normal throttle control. Incidentally, examples of conceivable techniques for setting the throttle opening amount TA as a target value as described above include a technique in which in an apparatus that performs a map computation of the target throttle opening amount Tta the map used for the computation is switched between the time of execution of the normal throttle control and the time of execution of the small throttle control, a technique in which the target throttle opening amount Tta set in the normal throttle control is reduced for correction, etc.

If the foregoing small throttle control is executed, the throttle opening amount TA rapidly becomes small with a small opening amount used as a target opening amount. Therefore there is a possibility that the throttle valve 14 may impact and break on a stopper that restricts the movement of the valve in the closing direction, that is, a stopper (not shown) that functions to prevent the throttle valve 14 from biting into the intake passageway 12. Therefore, in such a case, it is desirable to execute the throttle control so that the rate of change of the throttle opening amount TA becomes smaller when the throttle opening amount TA approaches the target opening amount.

Next, a control processing manner of the foregoing throttle control process will be described with reference to FIGS. 6A to 6E. FIGS. 6A to 6E are timing charts illustrating an example of the processing manner of the throttle control process and the lift amount changing control process in the case where the execution condition for the fuel cut control is met.

If, at a time t21, the accelerator pedal is released from depression so that the operation amount of the accelerator AC (FIG. 6B) becomes "0", both the throttle opening amount TA (FIG. 6C) and the lift amount VL (FIG. 6D) correspondingly reduce to magnitudes that are suitable for the idle operation of the internal combustion engine 10.

At this moment, the execution condition (FIG. 6A) regarding the fuel cut control is met in this embodiment. Therefore, at a time t22, the lift amount VL of the intake valve 30 is controlled so as to become smaller than the lift amount set in the normal lift control (the lift amount indicated by a one-dot chain line in FIG. 6D). Therefore, as mentioned above, the amount of intake introduced into the combustion chamber 18 (FIG. 6E) is more promptly reduced than the amount of intake in the case where the lift amount VL of the intake valve 30 is not made small (the lift amount indicated by a one-dot chain line in FIG. 6E).

Figure 6A:
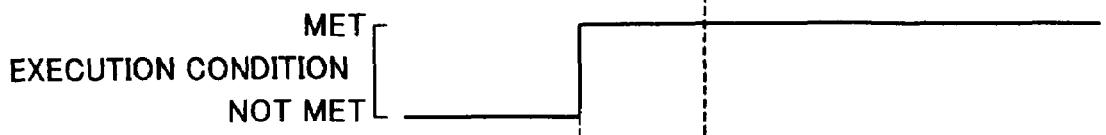
FIGS. 6A to 6E are timing charts illustrating an example of the processing manner of a lift amount changing control process and a throttle control process in accordance with the second embodiment.
Figure 6B:
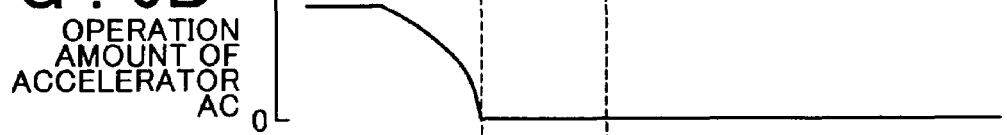
Figure 6C:
Figure 6D:
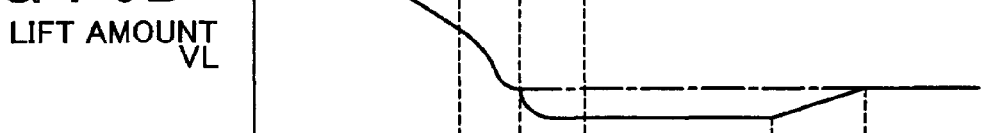
Figure 6E:
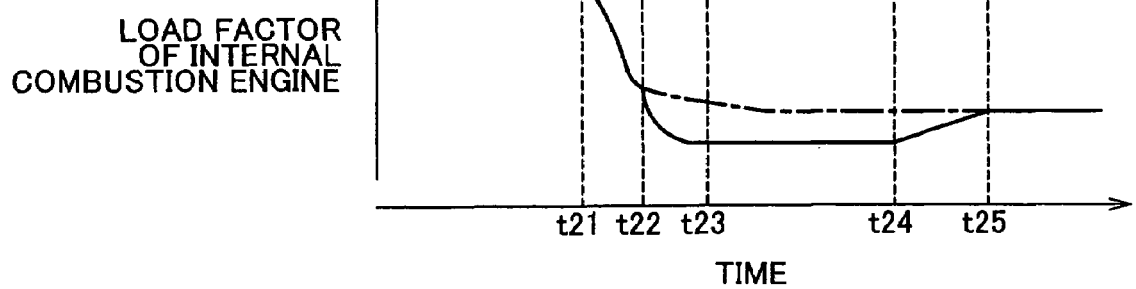

Along with this process, the throttle opening amount TA (FIG. 6C) is controlled so as to become smaller than the throttle opening amount set in the normal throttle control (the throttle opening amount indicated by a one-dot chain line shown in FIG. 6C). Therefore, the amount of intake air that flows into the intake passageway 12 downstream of the throttle valve 14, that is, the intake passageway extending from the throttle valve 14 to the combustion chamber 18, can be reduced as much as possible. Hence, it becomes possible to promptly reduce the amount of intake air introduced into the combustion chamber 18 while securing a deceleration feel at the time of deceleration of the internal combustion engine 10.

Furthermore, after the execution of the fuel cut control begins (time t24 to t25), the lift amount VL of the intake valve 30 is gradually increased until it becomes equal to the lift amount that is achieved in the normal lift control, and the throttle opening amount is gradually increased until it becomes equal to the throttle opening amount that is achieved in the normal throttle control. Therefore, in comparison with the case where neither the lift amount VL nor the throttle opening amount TA is increased in the foregoing fashion, the internal combustion engine 10 is operated in a state of reduced pumping loss, so that the sharp increase in engine torque upon the start of fuel supply resulting from the interruption of the fuel cut control can be eliminated or reduced.

As can be understood from the above description, this embodiment achieves the following advantage as well as the foregoing advantages (1) to (3).

(4) The throttle control is executed so that, prior to execution of the fuel cut control, the throttle opening amount TA becomes smaller than at the time of the normal idle operation where the fuel cut control is executed. Therefore, the amount of intake air that flows into the intake passageway 12 downstream of the throttle valve 14, that is, the intake passageway extending from the throttle valve 14 to the combustion chamber 18, can be reduced as much as possible. Hence, the deceleration feel at the time of deceleration of the internal combustion engine 10 can be secured. Furthermore, the amount of intake air introduced into the combustion chamber 18 can be promptly reduced.

Incidentally, the foregoing embodiments may be modified and carried out as follows.

In the foregoing embodiments, when the lift amount VL of the intake valve 30 and/or the throttle opening amount TA is increased during execution of the fuel cut control, the lift amount and/or the throttle opening amount is gradually increased to the value achieved in the normal lift control and/or the normal throttle control. The control position that is set as a target when the lift amount VL and/or the throttle opening amount TA is increased may be arbitrarily changed within such a range that unstable engine operation is not caused.

Furthermore, it is also possible to promptly increase the lift amount VL of the intake valve 30 and/or the throttle opening amount TA instead of gradually increasing it, or to omit the increasing of the lift amount VL of the intake valve 30 and/or the throttle opening amount TA.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. An intake amount control apparatus of an internal combustion engine, comprising:
   a control portion that controls an opening amount of a throttle valve provided in an intake passageway of the internal combustion engine and operation of a lift amount changing mechanism capable of changing a lift amount of an intake valve,
   wherein the control portion controls the operation of the lift amount changing mechanism so that, prior to execution of a fuel cut control at the time of an engine deceleration, the lift amount of the intake valve becomes smaller than at the time of a normal engine idle operation where the fuel cut control is not executed, wherein the control portion controls the opening amount of the throttle valve so that, prior to the execution of the fuel cut control at the time of the engine deceleration, the opening amount of the throttle valve becomes smaller than at the time of the normal engine idle operation where the fuel cut control is not executed.

2. The intake amount control apparatus of the internal combustion engine according to claim 1, wherein the control portion controls the operation of the lift amount changing mechanism so that the lift amount of the intake valve increases during the execution of the fuel cut control.

3. The intake amount control apparatus of the internal combustion engine according to claim 2, wherein the control portion controls the operation of the lift amount changing mechanism so that the lift amount of the intake valve gradually increases when the lift amount of the intake valve is increased during the execution of the fuel cut control.

4. The intake amount control apparatus of the internal combustion engine according to claim 1, wherein the control portion controls the opening amount of the throttle valve so that the opening amount of the throttle valve increases during the execution of the fuel cut control.

5. The intake amount control apparatus of the internal combustion engine according to claim 4, wherein the control portion controls the opening amount of the throttle valve so that the opening amount of the throttle valve gradually increases when the opening amount of the throttle valve is increased during the execution of the fuel cut control.

6. An intake amount control apparatus of an internal combustion engine, comprising:
a control portion that controls an opening amount of a throttle valve provided in an intake passageway of the internal combustion engine and operation of a lift amount changing mechanism capable of changing a lift amount of an intake valve,
wherein the control portion controls the operation of the lift amount changing mechanism so that, prior to execution of a fuel cut control at the time of an engine deceleration, the lift amount of the intake valve becomes smaller than at the time of a normal engine idle operation where the fuel cut control is not executed, the control portion controls the operation of the lift amount changing mechanism so that the lift amount of the intake valve increases during the execution of the fuel cut control, the control portion controls the opening amount of the throttle valve so that, prior to the execution of the fuel cut control at the time of the engine deceleration, the opening amount of the throttle valve becomes smaller than at the time of the normal engine idle operation where the fuel cut control is not executed.

7. The intake amount control apparatus of the internal combustion engine according to claim 6, wherein the control portion controls the opening amount of the throttle valve so that the opening amount of the throttle valve increases during the execution of the fuel cut control.

8. The intake amount control apparatus of the internal combustion engine according to claim 7, wherein the control portion controls the opening amount of the throttle valve so that the opening amount of the throttle valve gradually increases when the opening amount of the throttle valve is increased during the execution of the fuel cut control.

9. An intake amount control apparatus of an internal combustion engine, comprising:
a control portion that controls an opening amount of a throttle valve provided in an intake passageway of the internal combustion engine and operation of a lift amount changing mechanism capable of changing a lift amount of an intake valve,
wherein the control portion controls the operation of the lift amount changing mechanism so that, prior to execution of a fuel cut control at the time of an engine deceleration, the lift amount of the intake valve becomes smaller than at the time of a normal engine idle operation where the fuel cut control is not executed, the control portion controls the operation of the lift amount changing mechanism so that the lift amount of the intake valve increases during the execution of the fuel cut control, the control portion controls the operation of the lift amount changing mechanism so that the lift amount of the intake valve gradually increases when the lift amount of the intake valve is increased during the execution of the fuel cut control, the control portion controls the opening amount of the throttle valve so that, prior to the execution of the fuel cut control at the time of the engine deceleration, the opening amount of the throttle valve becomes smaller than at the time of the normal engine idle operation where the fuel cut control is not executed.

10. The intake amount control apparatus of the internal combustion engine according to claim 9, wherein the control portion controls the opening amount of the throttle valve so that the opening amount of the throttle valve increases during the execution of the fuel cut control.

11. The intake amount control apparatus of the internal combustion engine according to claim 10, wherein the control portion controls the opening amount of the throttle valve so that the opening amount of the throttle valve gradually increases when the opening amount of the throttle valve is increased during the execution of the fuel cut control.

* * * * *